United States Patent

Tornheim

[15] 3,641,835
[45] Feb. 15, 1972

[54] TENSIONING DEVICE

[72] Inventor: Harold Tornheim, 430 North Auburn Avenue, Sierra Madre, Calif. 91024

[22] Filed: Apr. 23, 1970

[21] Appl. No.: 31,073

Related U.S. Application Data

[62] Division of Ser. No. 749,358, Aug. 1, 1968, Pat. No. 3,522,894.

[52] U.S. Cl. ........................................... 74/501.5
[51] Int. Cl. .............................................. G05g 5/00
[58] Field of Search .................... 254/185; 74/501.5, 506; 267/167

[56] References Cited

UNITED STATES PATENTS

| | | | |
|---|---|---|---|
| 247,169 | 9/1881 | Coker | 254/185 |
| 684,599 | 10/1901 | Browning | 254/185 |
| 3,003,585 | 10/1961 | Andersson | 254/185 |
| 2,562,028 | 7/1951 | Foss | 254/185 |
| 530,995 | 12/1894 | Humphrey | 254/185 |

*Primary Examiner*—Milton Kaufman
*Attorney*—Christie, Parker & Hale

[57] ABSTRACT

A tensioning device for maintaining a pair of coacting tension lines taut includes an elongated threaded shaft, and a pair of drums rotatably mounted on the shaft so they move axially relative to the shaft as they rotate. An end of each tension line is wound around a respective one of the drums, and a load imposed upon the other end of each line rotates the respective drums about the shaft. Biasing means rotationally bias each drum in a direction opposite to the direction of the torque imparted to the drums by the load so as to take up the slack in the tension lines to maintain them taut. Stop means limit rotation of the drums imposed by the load acting on the tension lines to limit the lengths of the tension lines that run out.

5 Claims, 5 Drawing Figures

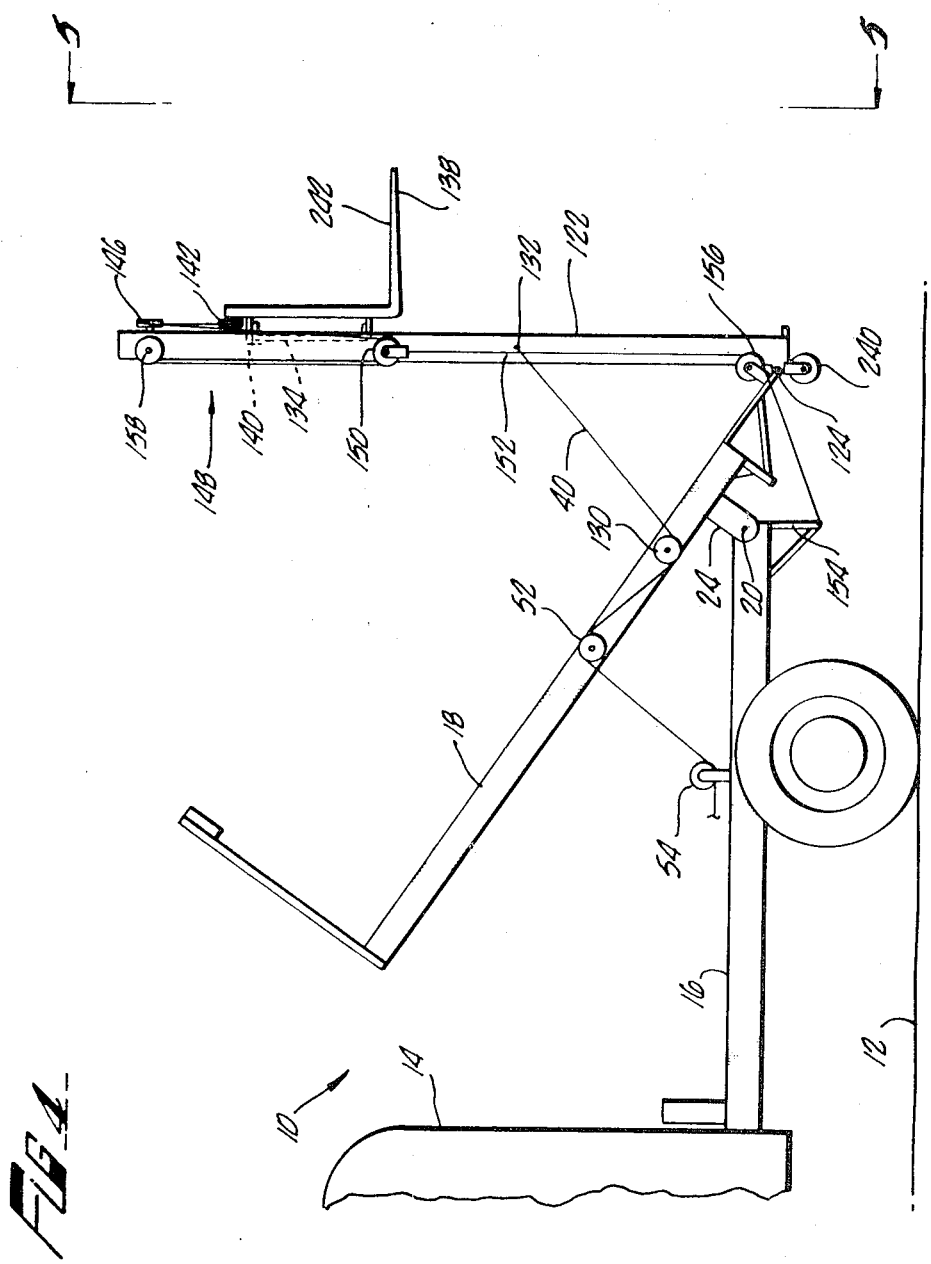

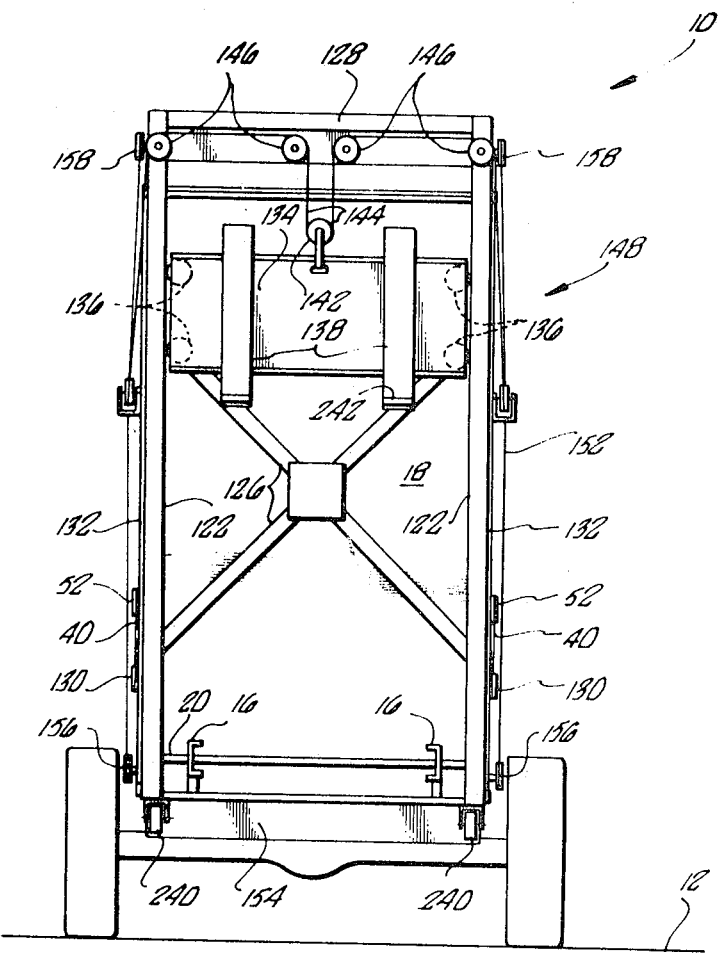

TENSIONING DEVICE

CROSS-REFERENCE TO RELATED APPLICATION

This is a divisional application of my copending application Ser. No. 749,358, filed Aug. 1, 1968, now U.S. Pat. No. 3,522,894.

BACKGROUND OF THE INVENTION

1. Field of the Invention

This invention relates to a lift-bed truck and, more particularly, to a truck having a truck bed that can incline steeply and that has a pivotable platform for permitting simplified loading and unloading of the truck.

2. Description of the Prior Art

A pickup truck is a versatile vehicle, which numerous commercial organizations as well as private individuals employ. It can be adapted for carrying miscellaneous objects of freight that fit the truck bed and are within its load capacity. For example, private individuals commonly mount a camper on the truck bed. In other cases, the vehicle has a rack extending over the cab for carrying long objects of freight, such as ladders, planks, and lengths of pipe.

A serious obstacle to a full exploitation of the truck's versatility is the difficulty of loading and unloading heavy objects of freight between ground and the truck bed. Without a tailgate lift, one man alone cannot load and unload heavy freight. Pushing the freight up a ramp of planks is difficult, physically exhausting, and in many cases impossible because of the weight of the objects being handled.

A conventional tailgate lift is a permanent and expensive accessory. In many cases, it usurps the spare tire's storage space. It may make the mounting of a camper impossible. The inherent versatility of the truck is therefore of meager benefit.

A conventional lift-bed truck is in wide use as a dump truck, which can unload bulk material easily and economically by dumping. A truck of this type, however, is of minimal value in conjunction with material to be dumped. It is not possible to use the lift-bed feature of the truck for loading the material.

SUMMARY OF THE INVENTION

This invention employs a hoisting member pivotally connected to the lift-bed of a truck, together with its actuating mechanism, for the hoisting and lowering of material. Tension lines connect the hoisting member to the truck chassis. Hoisting or lowering results when the truck bed is inclined by the actuating mechanism.

An especially preferred hoisting member comprises a lifting platform pivotally secured to the rear portion of the truck bed. The actuating means pivots the truck bed from a horizontal position parallel the chassis into an inclined position, and vice versa. A pair of tension lines connects the lifting platform to the chassis and maintains the lifting platform in a horizontal position irrespective of the angular inclination of the truck bed. Means for guiding the tension lines along the truck bed and chassis are also provided.

The lifting platform is preferably secured to the tailgate of a truck bed. It enables the loading of material by providing a horizontal surface positioned adjacent the ground when the truck bed is in an inclined position. After the load has been placed on the platform, the truck bed pivots into its horizontal position such that the load on the platform rises to the elevation of the now horizontal truck bed. In this position, the truck bed, tailgate, and lifting platform are coplanar, and the load can be moved in a horizontal direction onto the truck bed.

An adjusting means can be utilized with the lifting platform to maintain the tension lines taut in all positions of the truck bed, the tailgate, and the platform. Thus, the tailgate pivots into a closed position such that it is vertical relative to the truck bed, and the platform is positioned adjacent and parallel to the tailgate. A freed length of tension line is taken up by the adjusting means such that the lines remain taut and do not hang loosely about the truck. If the tension lines are not maintained taut, they can become disengaged from pulleys or other guide means and may impair the proper functioning of the apparatus. When the platform is extended to receive a load, the adjusting means automatically runs out a sufficient length of tension line to maintain the platform in a horizontal position. At that position, the adjusting means is locked to prevent additional tension line from being payed out, which would cause the platform to pivot into a nonhorizontal position.

The preferred adjusting means includes a left and a right drum each having a periphery in engagement with a respective tension line, and shaft means secured to the chassis of the truck for rotatably mounting the drums. Biasing means rotationally bias each drum in a first direction to impart tension onto the lines, and stop means prevent rotation of the drums in a second direction opposite to the first direction under a load imposed upon the ends of the tension lines adjacent to the hoisting member when the hoisting member is disposed in its working position.

An alternate preferred hoisting member of this invention is a forklift attachment for hoisting loads off the ground and stacking them on top of one another, or for carrying loads over short distances. The forklift attachment comprises a fork mounted on a dolly at the rear of the truck bed. The dolly engages upright posts that are pivotally secured to the truck bed. Tension lines connect the dolly with the truck chassis such that the dolly and fork more in a vertical direction when the truck bed is inclined.

The hoisting member of this invention can be employed to perform a variety of operations, such as lifting, lowering, loading and unloading. There is no need for special auxiliary equipment or difficult and time-consuming manual operations. Thus, the apparatus represents a significant advance over conventional lift-bed trucks or other available equipment of this type.

BRIEF DESCRIPTION OF THE DRAWINGS

FIG. 4 is a fragmentary side elevation view of a lift-bed truck provided with lift forks constructed according to this invention; and FIG. 5 is a rear elevation view taken along lines 5—5 of FIG. 5.

DESCRIPTION OF THE PREFERRED EMBODIMENTS

Figure 1:
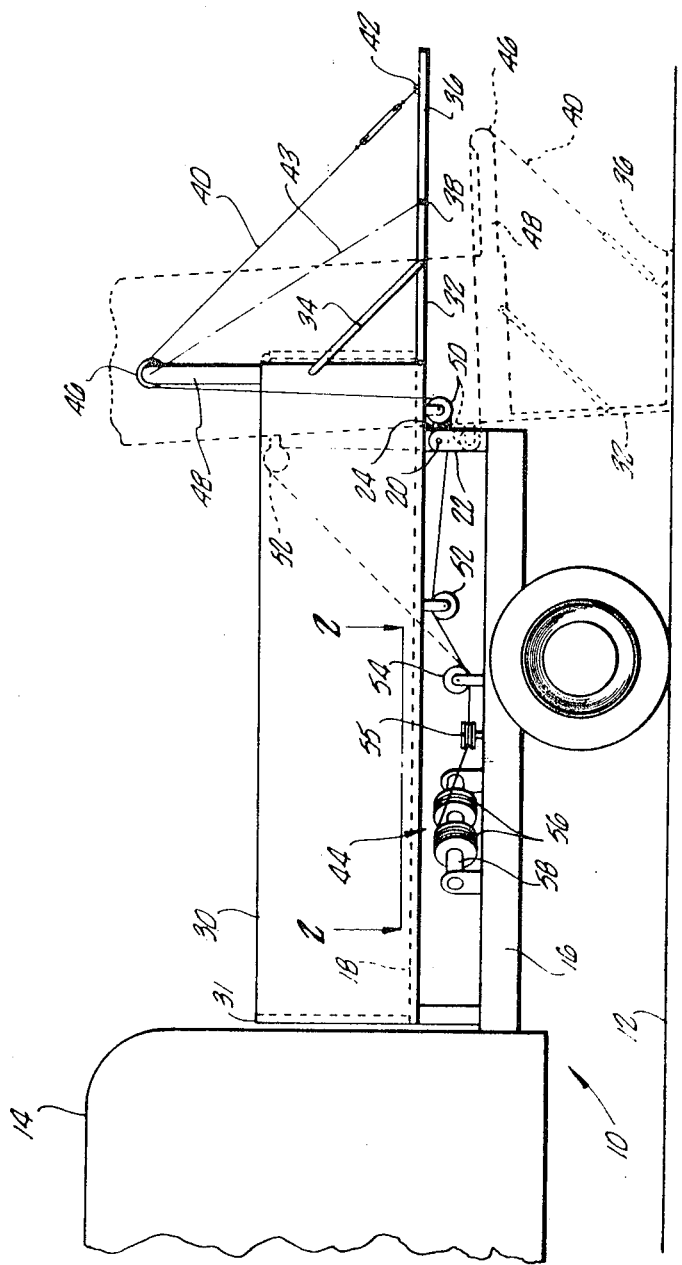
FIG. 1 is a fragmentary side elevation view of a lift-bed truck provided with a horizontal platform pivotally secured to a tailgate of the truck.

FIG. 1 shows a conventional lift- or tilting-bed truck 10 parked on a ground 12. The truck has a driver's cab 14 adjacent its front end and a chassis 16 extending from the cab toward the truck's rear end. A chassis pivot pin 20 pivotally secures a truck bed 18, for carrying freight, to the chassis. The pin engages brackets 22 and 24 mounted on the chassis and the truck bed, respectively. A hydraulic cylinder (not shown), pivotally secured at one of its two ends to the chassis and at its other end to the truck bed, inclines the truck bed about the chassis pivot pin 20 into a position inclined from the horizontal. Phantom lines in FIG. 1 show this inclined position. Hydraulic lines (not shown) energize the hydraulic cylinder.

A double-acting type of hydraulic cylinder may be necessary if gravity alone cannot return the truck bed into its horizontal position. The truck bed can thereby be tilted into a substantially vertical position and it can be positively returned to its horizontal position without having to rely on gravity. Alternately, a mechanical actuator such as a screw drive (not shown) may replace the hydraulic cylinder.

The truck bed, a type standard for many trucks, has a pair of sidewalls 30, a front wall 31, and a tailgate 32. The tailgate is of the type standard on fixed-bed trucks, the type of tailgate that pivots at the floor of the truck bed, and not of the type standard on dump trucks. Instead of a pair of chains or steel cables that supports the open tailgate in a standard fixed-bed truck, this invention uses a pair of bars 34. Chains or cables are not suitable because in a steeply inclined position of the truck bed, gravity is not enough to maintain the tailgate fully open, coplanar with the truck bed.

A substantially rectangular platform 36 piovts to the rear end of the tailgate at a platform pivot pin 38. The platform extends rearwardly from the tailgate whenever the tailgate is open. (The platform hangs vertically and inoperatively whenever the tailgate is closed.)

A pair of tension lines 40, constructed of steel cable or chain, extends from the platform to an adjusting means 44 mounted on the chassis. One end of each tension line fastens to the platform at one of a pair of eyebolt plates 42. The other end of each tension line fastens to the adjusting means. Between the two ends of each tension line are pulleys, also arranged in pairs, to guide it. The pairs of pulleys arranged in order along the tension lines, starting from the eyebolt plates 42, are as follows:

a. top sheaves 46, on a pair of upright posts 48 at the rear end of the truck bed;

b. first guide pulleys 50, at the rear end of the underside of the truck bed;

c. second guide pulleys 52, more forward than the first guide pulleys 50, but still on the underside of the truck bed;

d. third guide pulleys 54, on the chassis;

e. fourth guide pulleys 55, on the chassis just before the adjusting means 44.

From the second guide pulleys 52 the tension lines are guided towards and into engagement with the adjusting means 44 secured to the chassis 16. Preferably, pairs of serially arranged third pulleys 54 are disposed intermediate the second pulleys 52 and the adjusting means to properly guide and position the tension lines relative to the adjusting means.

In order to understand how the platform 36 remains horizontal irrespective of its height from the ground 12 to the level of the horizontal truck bed 18, let us consider the dynamic geometry of two triangles. The three angles of the first triangle are at the platform pivot pin 38, the eyebolt plate 42, and the top sheave 46. Two sides of the triangle have fixed lengths: one is the platform 36 from the platform pivot pin 38 to the eyebolt plate 42, and the other is the dot-and dashed construction line 43 from the top sheave 46 to the platform pivot pin 38. The third side, consisting of a length of the tension line from the top sheave 46 to the eyebolt plate 42, varies in length.

The three angles of the second triangle are at the chassis pivot pin 20, at the second guide pulley 52, on the truck bed, and at the third guide pulley 54, on the chassis. Again, two sides have fixed lengths: one is along the truck bed from the chassis pivot pin 20 to the second guide pulley 52, and the other is along the chassis from the chassis pivot pin 20 to the third guide pulley 54. Again, the third side, consisting of a length of the tension line, from the second guide pulley 52 to the third guide pulley 54, varies in length. Furthermore, let us at first consider the adjusting means 44 static, that is, that the tension line from the adjusting means to the third guide pulley is motionless.

In this circumstance, the sum of the lengths of the tension line in the two triangles is a constant; if one triangle takes more of the tension line, it must take it away from the other triangle. If the truck inclines from the horizontal position, the second triangle requires more of the tension line. The second triangle takes it away from the first triangle, so that the top sheave 46 must approach the eyebolt plate 42. In a proper design, the rate of approach maintains the platform horizontal.

The platform is absolutely horizontal only at a few isolated points in its travel. But it takes a spirit level to detect the deviation from absolute horizontality at all points in the travel. Since the purpose of the platform is the loading and unloading of freight, the platform is practicably horizontal.

The guide pulleys that do not form angles of the two triangles are unessential to the theory of the operation of the tailgate lift. There may be more pulleys, or some of those already described may be absent. Their presence depends on the specific design in a particular truck using the invention.

The pulleys shown in FIG. 1 are fixed sheaves. Of course, swivel blocks or blocks each on a shackle (not shown) can replace them in order to assure their alignment with the tension line as the truck bed inclines.

The described embodiment is the preferred one because it conforms basically to a conventional dump truck. An alternate embodiment converts the platform into the truck's tailgate. This conversion eliminates the former tailgate 32 and the bars 34, and the sidewalls 30 consequently extend to the platform pivot pin 38.

If the tailgate is closed, as the phantom lines of FIG. 1 show, the platform pivots about the platform pivot pin 38 into a vertical position substantially parallel to and adjacent the tailgate. In this position, the distance between the top sheave 46 and the eyebolt plate 42 is substantially less than that in the open position of the tailgate. The tension lines are therefore loose, and they may become entangled or disengaged from the guide pulleys. A purpose of the adjusting means 44 is to take up the length of the tension lines that is free whenever the tailgate is closed. The adjusting means is not an essential. It is possible, for example, after the tailgate is closed, to pull on the tension lines at the eyebolt plate 42 in order to take up slack, then to demount the tension lines from the eyebolt plates, and finally to secure the tension lines suitably to the upright posts 48.

Figure 2:
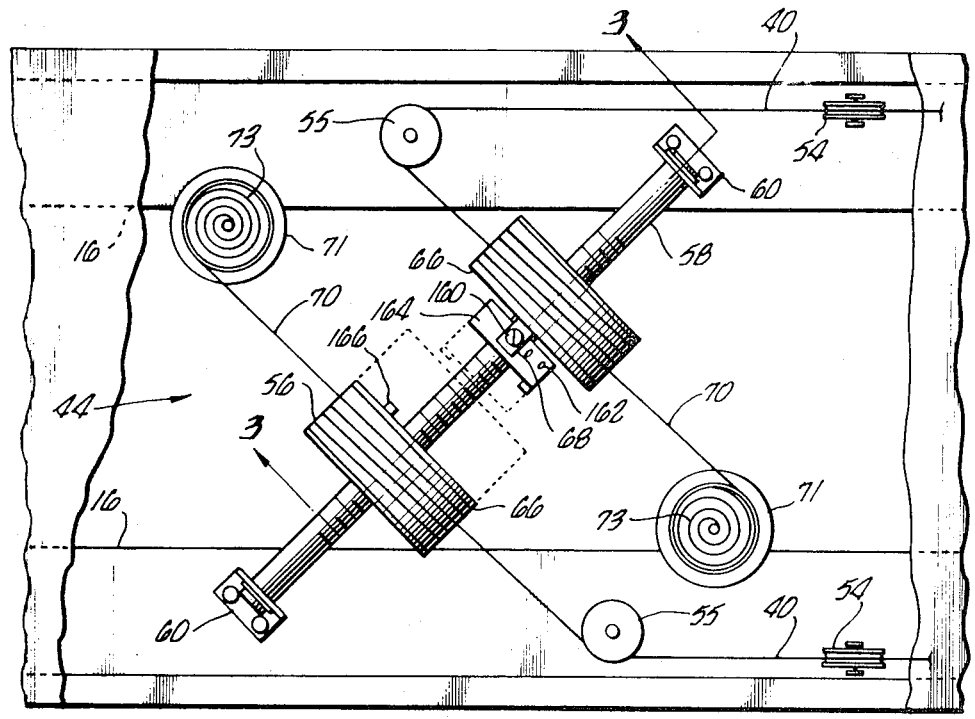
FIG. 2 is a fragmentary top view taken, with parts broken away, along lines 2—2 of FIG. 1.
Figure 3:
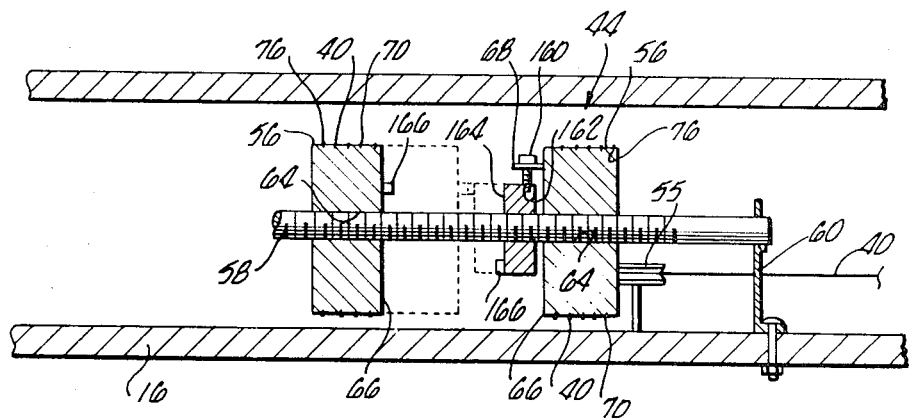
FIG. 3 is a cross-sectional elevation view taken along lines 3—3 of FIG. 2.

FIGS. 2 and 3 show the adjusting means. Two cylindrical drums 56 mount coaxially on a threaded shaft 58 secured at its ends to the chassis 16 by means of mounting brackets 60. The shaft engages a correspondingly threaded aperture 64 in each drum, so that the drums are free to rotate about the shaft. As the drums rotate on the thread, they move axially as well. On the face 66 of one of the drums that faces the other drum is a lug 68 that is radially offset from the center of the drum and that extends axially towards the other drum. The lug includes a threaded bolt 160 with a radially aligned axis and an inner end in engagement with an aperture 162 in the periphery of an adjusting cylinder 164. While the bolt engages an aperture, the drum and the adjusting cylinder are locked together.

Engaging the bolt 160 in another aperture 162 varies the axial distance between the drum and the adjusting cylinder. The adjusting cylinder also has a mating thread that engages the threads of the shaft 58. The thread in the adjusting cylinder adds nothing to the functioning of the locked drum and adjusting cylinder. The purpose of the thread is to aid in making the change in axial distance. The drum without the lug 68 has a dog 166, and the adjusting cylinder likewise has a dog 166, both dogs projecting toward each other. The arrangement of the dogs is such that they engage each other if the drum and the adjusting cylinder are sufficiently close to each other. Upon their engagement, both drums and the adjusting cylinder are locked to each other, and they must rotate together.

The periphery of each drum has a helical groove 76 to engage and guide one of the tension lines 40. A suitable means, such as a clamp (not shown) secures the end of the tension line at the end of the drum facing the mounting bracket 60. The tension lines wind around the drums in like directions; that is, both tension lines wind around the periphery of the drum in either a left-handed or right-handed manner depending on whether the shaft 58 has a right-handed or left-handed thread. The pitch of the groove in the drum is preferably the same as that of the thread on the shaft so as to maintain the course of the tension line 40 fixed between the fourth guide pulley 55 and the drum. This fixed course confines the tension line to pass through a small hole in a dust cover (not shown) for the adjusting means. The tension lines extend away from the respective drums in opposing directions, as FIG. 2 shows. A force on one of the tension lines 40 imparts a torque on its associated drum, which rotates it about the shaft. The drum at the same time also moves axially along the shaft toward the other drum.

Wound in a portion of the groove in each drum unoccupied by the tension line is one of a pair of spring leads 70, consisting of a light wire cable or chain. One end of the spring leader fastens to the drum in the same manner as the tension line fastens, but at the other end of the drum. Consequently, as the drum rotates and reels in the tension line, it pays out the spring leader at the same rate. Conversely, the drum pays out the tension line at the same rate as it reels in the spring leader. Consequently, the tension line and the spring leader cannot interfere with each other.

The other end of the spring leader fastens to one of a pair of spools 71 each with its spiral retractable spring 73. The spring leader fastens in such a way as to wind around the spool. The mechanism of the spool 71 and the spring 73 is common in other devices, such as an automatically retractable clothes line, or an automatically retractable key chain, or an automatically retractable tape measure, or a balancer in a double hung window sash.

The spools 71 with their springs 73 fasten to the chassis 16 at fixed locations in proper physical relation to the adjusting means. The spring leader 70 has a fixed course between the drum and the spool for the same reason that the tension line has a fixed course between the drum and the fourth guide pulley.

It is obvious that in an alternate construction, the tension line could replace the spring leader and wind directly in the spool after the tension line has wound a few turns around the drum. Slippage of the tension line on the drum and a large capacity spool to accommodate the necessarily large diameter of the tension line make this alternate a secondary choice.

The spring leader 70 imparts biasing torque on the drum, which opposes a torque also imparted on the drum by the tension line 40 under tension. The spring leaders impart sufficient biasing torque on the drums to maintain the tension lines taut. The springs 73 should not be oversize because they could in that case affect the operation of the tension lines and the platform 36. For example, oversized springs could pivot the platform and the tailgate 32 into a closed position. If the tailgate opens, the distance between the eyebolt plate 42 and the top sheave 46 increases until the platform, the tailgate, and the truck bed 18 are simultaneously in a horizontal position. As the tailgate opens, the weight of the platform subjects each tension line 40 to a force, which is transmitted through a tension line to the periphery of each drum. This force rotates the drums about the shaft 58 in opposing directions against the biasing torque of the spring leaders while the drums move axially towards each other. The arrangement of the drums is such that the dogs 166 engage each other after a critical amount of the tension line runs out to set the platform coplanar with the truck bed and the tailgate if the truck bed is parallel to the chassis 16. The correct adjustment, made by lengthening or shortening the tension lines between the adjusting means and the eyebolt plates, occurs when the adjusting means is first installed on the truck. A turnbuckle at the eyebolt plate allows for an occasional correction in the length of the tension line as the tension line ages.

Thereafter, each time the tailgate 32 is lowered, the weight of the platform 36 causes the drum to release a critical amount, and no more, of the tension line to set the platform horizontally. The horizontal position of the platform is assured irrespective of the angular position of the truck bed relative to the chassis since any difference in the distance between the top sheave 46 and the eyebolt plate 42 due to an angular inclination of the truck bed is compensated for by the displacement of the second guide pulley 52 relative to the third guide pulley 54. Each time the tailgate is closed, the biasing torque of the springs 73 rotates the drums to take up any slack in the tension lines 40 and to maintain them taut.

The purpose of the adjusting cylinder now becomes evident. If there are other attachments to the truck, such as the forklift attachment describe later, that require different lengths of the tension lines, the multiple apertures 162 in the adjusting cylinder allow for a selection of lengths by limiting the travel between the drums before the dogs 166 engage. If there is no need for different lengths of the tension lines, the adjusting cylinder is superfluous, and it may be absent. In that case, both drums are alike; each has a dog 166 that engages the other.

Aside from maintaining the tension lines 40 taut, the adjusting means acts as a tension equalizer. If a load is eccentrically placed on the platform 36 and one of the pair of tension lines carries substantially more weight than the other, that tension line lengthens, the other shortens, and the platform twists imperceptibly in the process of distributing the load between the two tension lines equally. The adjusting means thereby reduces the maximum possible stress to half. The respective lengthening and shortening of the tension lines takes place while the dogs 166 are engaged. A greater load on one tension line rotates the locked-together drums 56 about the shaft 58 until the forces in the two tension lines are equal. Rotation of the drums as a unit pays out lengths of one of the tension lines at the same rate that it reels in the other. The actual movement is barely perceptible.

Note that any suitable adjusting means can equalize the tension lines or maintain them taut. For example, a cross beam (not shown) pivoted to the chassis 16 of the truck can equalize the tension lines. The ends of the tension lines 40 connect to the ends of the beam. If the forces on the tension lines become unequal, the cross beam pivots about its center until the forces become equal. The beam may include means secured to its ends for reeling in slack in the tension lines. Constructing the two tension lines as a single unit guided over a pulley arrangement also equalizes the forces.

Another preferred embodiment of this invention, a forklift attachment 120, appears in FIGS. 4 and 5. The forklift attachment includes a pair of laterally spaced elongated tracks 122 that pivot to the truck bed's rear end by means of a forklift pivot pin 124. During lifting operations, the tracks 122 assume a vertical position. The tracks are preferably U-shaped channels having their flanges facing each other. A pair of crossmembers 126 and a transverse beam 128 across the top of the tracks secure the pair of tracks to each other. The forklift attachment uses the pair of tension lines 40 also shown in FIG. 1. The tension line runs over the second guide pulley 52 and the third guide pulley 54, respectively secured to the truck bed and the truck chassis 16, and over an additional guide pulley 130. The tension line's free end fastens to the track 122 at a point 132. The tension lines and guide pulleys maintain the tracks 122 in a vertical position during inclination of the truck bed 18.

The forklift attachment 120 includes a dolly 134 provided with pairs of guide wheels 136 adjacent each end of the dolly and in engagement with the tracks 122. Preferably, a wide channel constitutes the dolly. The channel carries a pair of forks 138. The forks are freely translatable between the center of the dolly and its outer ends adjacent the tracks 122. Holding brackets 140, reaching over and behind the beam of the dolly, best seen in FIG. 4, prevent the forks from disengaging from the dolly.

The upper flange of the channel defining the dolly 134 has an equalizing pulley 142, which is centered between the tracks 122 and engages parallel strings of upwardly extending hoist lines 144. Pairs of pulleys 146 mounted adjacent the transverse beam 128 guide the hoist lines first upwards and then parallel and adjacent to the tracks 122 in a direction towards the forklift pivot pin 124. Each hoist line ends by becoming the falls in one of a pair of block and tackle arrangements 148, each comprising also a running block 150 and a fall block 158. One end of a pair of lift lines 152 fastens to the axle (not shown) of the running block 150, and the other end of the lift line fastens to a support 154 mounted on the chassis 16 of the truck. A pulley 156, one of a pair mounted near the forklift pivot pin 124, guides the lift line 152. Whenever the truck bed is in its most steeply inclined position, the distance between the fall block 158 of the block and tackle arrangement 148 and the support 154 is at a minimum. In this case, the block and tackle arrangement frees a length of the hoist line 144 to place the forks 138 at their lowermost position, adjacent the ground 12. Increasing the distance between the fall block 158 and the support 154 by inclining the truck bed into a horizontal position shortens the available length of the hoist line 144 between the equalizing pulley 142 and the running block 150. This moves the forks 138 upwards toward the transverse beam 128. During this inclination of the truck bed into a horizontal position, the tension lines 40 maintain the tracks in a vertical position. The center of gravity of the forklift arrangement 120, especially if the forks 138 are carrying freight, is rearwardly of the forklift pivot pin 124, a configuration that maintains the tracks vertical and the tension lines 40 taut. The tension in the lift lines 152 also maintains the tracks vertical and the tension lines 40 taut.

If the truck bed 18 can incline into a vertical position, it is a simple matter to mount the forklift attachment 120 onto the truck 10. In this position, the truck and the forklift attachment align with each other, and then the forklift pivot pin 124 secures them together. Next, the free ends of the tension lines 40 fasten to the tracks at the points 132, and the ends of the lift lines 152 fasten to the supports 154.

In use, the forks 138 first are adjacent the ground 12, and then the truck backs up to a load of goods (not shown) that is to be moved and hoisted on top of a stack of goods. After horizontal portions 242 of the forks 138 are underneath the load, the truck bed 18 inclines towards its horizontal position. The inclination continues until the forks are at a level for stacking. Note that the block and tackle arrangement 148 causes the forks to move along the tracks 122 at a rate that is as many time as fast as the running block 150 moving away from the fall block 158 as is the mechanical advantage built into the block and tackle arrangement. After the load has been stacked, the forks lower to pick up another load and move it.

In a somewhat more simplified embodiment of the forklift attachment (not shown), the channel for the forks 138 remains, but there are no dolly and tracks. In place of the tracks, there is a pair of single upright posts. This embodiment likewise pivots to the truck bed 18 at the forklift pivot pin 124, and the pair of tension lines 40 likewise maintains the upright posts in a vertical position irrespective of the position of the truck bed. The functioning of this embodiment is similar to that of the structure shown in FIG. 1, which has a horizontal platform 36. It is better suited than the structures shown in FIG. 1 for moving loads over short distances, such as within a plant, since the horizontal portions 242 of the forks, not connected to the tension lines, can be moved in or out from the center line of the truck, and are therefore adapted to carry loads of widely differing configurations. The forklift attachment of FIGS. 4 and 5 can function like the simplified forklift embodiment if the lift lines 152 are unconnected, so that the dolly remains at its lowermost position, resting on a stop (not shown) at the bottom of the tracks. The advantage of such operation is that the forks can lift a heavier load.

The embodiment of FIG. 1, with the platform 36, and the simplified forklift attachment, or the forklift attachment of FIGS. 4 and 5 operating in the manner described in the preceding sentence, can carry a top-heavy load on its back if the truck bed can incline into a vertical position. For this mode of operation, devices (not shown) fix the relative position of the platform 36 or of the forklift attachment rigidly to the truck bed while the truck bed is in its vertical position. Thereupon, the tension lines 40 become inoperative; the adjusting means 44 automatically reels in the slack whenever the truck bed inclines. Upon inclination of the truck bed towards its horizontal position, the platform, or the pair of forks, swings out of its horizontal position. In the process, the load rotates onto its back, well-supported all of the while, and comes to rest on the truck. The load thereby will not tip while the truck transports it.

I claim:

1. Apparatus for maintaining a pair of coacting load tension lines taut and for limiting maximum lengths of the load tension lines that can be removed from the apparatus, the apparatus comprising:
   a. a left and a right drum each having a periphery in engagement with a respective load tension line;
   b. a stationary threaded shaft for mounting the drums, each drum being threaded onto the shaft so as to rotate on the shaft and move axially relative to the shaft during rotation;
   c. means for imparting a continuous rotational bias to each drum in a first direction to impart tension onto the load tension lines engaged therewith to take up slack in each line; and
   d. stop means for preventing rotation of the drums in a second direction opposite to the first direction under a load imposed upon the load tension lines.

2. Apparatus according to claim 1 wherein each drum has a spiral groove in its outer periphery for cooperation with its respective tension line, and wherein the pitch of the grooves is the same as that of the threads on the shaft.

3. Apparatus according to claim 1 wherein the stop means includes means for connecting the drums after predetermined lengths of the tension lines have run out.

4. Apparatus for maintaining a pair of coacting tension lines taut and for limiting maximum lengths of the tension lines that can be removed from the apparatus, the apparatus comprising:
   a. a left and a right drum each having a respective tension line wound around its periphery;
   b. shaft means for rotatably mounting the drums;
   c. biasing means for rotationally biasing each drum in a first direction to impart tension onto the lines, the biasing means including a left and a right retractable spool, a left spring leader connected between the end of one tension line and the left spool, and a right spring leader connected between the end of the other tension line and the right spool; and
   d. stop means for preventing rotation of the drums in a second direction opposite to the first direction under a load imposed upon the tension lines.

5. Apparatus for maintaining a pair of coacting tension lines taut and for limiting maximum lengths of the tension lines that can be removed from the apparatus, the apparatus comprising:
   a. a left and a right drum each having a periphery in engagement with a respective tension line;
   b. shaft means for rotatably mounting the drums;
   c. biasing means for rotationally biasing each drum in a first direction to impart tension onto the lines; and
   d. stop means for preventing rotation of the drums in a second direction opposite to the first direction under a load imposed upon the tension lines, the stop means including an adjusting cylinder mounted on the shaft means between the drums, the cylinder having a set of apertures in its periphery, means for connecting the cylinder to the left drum, the connecting means including a leg on the left drum and an axially movable member for engaging a selected one of said apertures whereby the cylinder and the left drum are locked to each other, a dog on the cylinder facing the right drum, and a dog on the right drum facing the cylinder, the dogs engaging each other such that the lengths of the tension lines run out can be adjusted by the selection of different apertures engaged by the axially movable member.

* * * * *

PO-1050
(5/69)

UNITED STATES PATENT OFFICE
CERTIFICATE OF CORRECTION

Patent No. 3,641,835  Dated February 15, 1972

Inventor(s) HAROLD TORNHEIM

It is certified that error appears in the above-identified patent and that said Letters Patent are hereby corrected as shown below:

Col. 1, line 38, "material to be dumped" should read --material not to be dumped--.

Col. 1, lines 43-44, "connected" is not printed completely.

Col. 2, line 26, "fork more" should read --fork move--.

Col. 3, line 7, "piovts" should read --pivots--.

Col. 5, line 4, "spring leads" should read "spring leaders--

Col. 5, line 75, "describe" should read --described--.

Col. 7, line 32, "time" should read --times--.

Claim 5, col. 8, line 61, "leg" should read --lug--.

Signed and sealed this 18th day of July 1972.

(SEAL)
Attest:

EDWARD M. FLETCHER, JR.
Attesting Officer

ROBERT GOTTSCHALK
Commissioner of Patents